United States Patent [19]

Anderson

[11] Patent Number: 5,796,526
[45] Date of Patent: Aug. 18, 1998

[54] ILLUMINATION OPTICS FOR SPATIAL LIGHT MODULATOR

[75] Inventor: Charles H. Anderson, Dallas, Tex.

[73] Assignee: Texas Instruments Incorporated, Dallas, Tex.

[21] Appl. No.: 735,277

[22] Filed: Oct. 21, 1996

Related U.S. Application Data

[63] Continuation of Ser. No. 429,367, Apr. 26, 1995, abandoned.

[51] Int. Cl.[6] .................................................. G02B 13/08
[52] U.S. Cl. .......................... 359/671; 359/618; 359/291
[58] Field of Search ................................ 359/11, 40, 41, 359/289, 638, 639, 618, 290, 291, 710, 719, 668, 671; 362/800

[56] References Cited

U.S. PATENT DOCUMENTS

| 5,159,485 | 10/1992 | Nelson | 359/291 |
| 5,170,181 | 12/1992 | Tamada | 346/108 |
| 5,386,250 | 1/1995 | Guerinot | 348/770 |
| 5,408,553 | 4/1995 | English, Jr. et al. | 385/36 |

FOREIGN PATENT DOCUMENTS

| 0 444 665 A2 | 9/1991 | European Pat. Off. |
| 0 493 829 A1 | 7/1992 | European Pat. Off. |
| 0 547 493 A1 | 6/1993 | European Pat. Off. |

*Primary Examiner*—Georgia Y. Epps
*Assistant Examiner*—Dawn-Marie Bey
*Attorney, Agent, or Firm*—Julie L. Reed; James C. Kesterson; Richard L. Donaldson

[57] ABSTRACT

Variations on the Koehler illumination system, used for providing light to be reflected from, or transmitted by, an SLM. An anamorphic illumination system (10) uses multiple light sources (11) and a cylindrical lens (14) to provide an elongated and compressed beam to the SLM (16). A cascaded illumination system (30) uses multiple light sources (31) and multiple TIR prisms (33) to provide an extended light beam or one that is more intense, to the SLM (36).

11 Claims, 2 Drawing Sheets

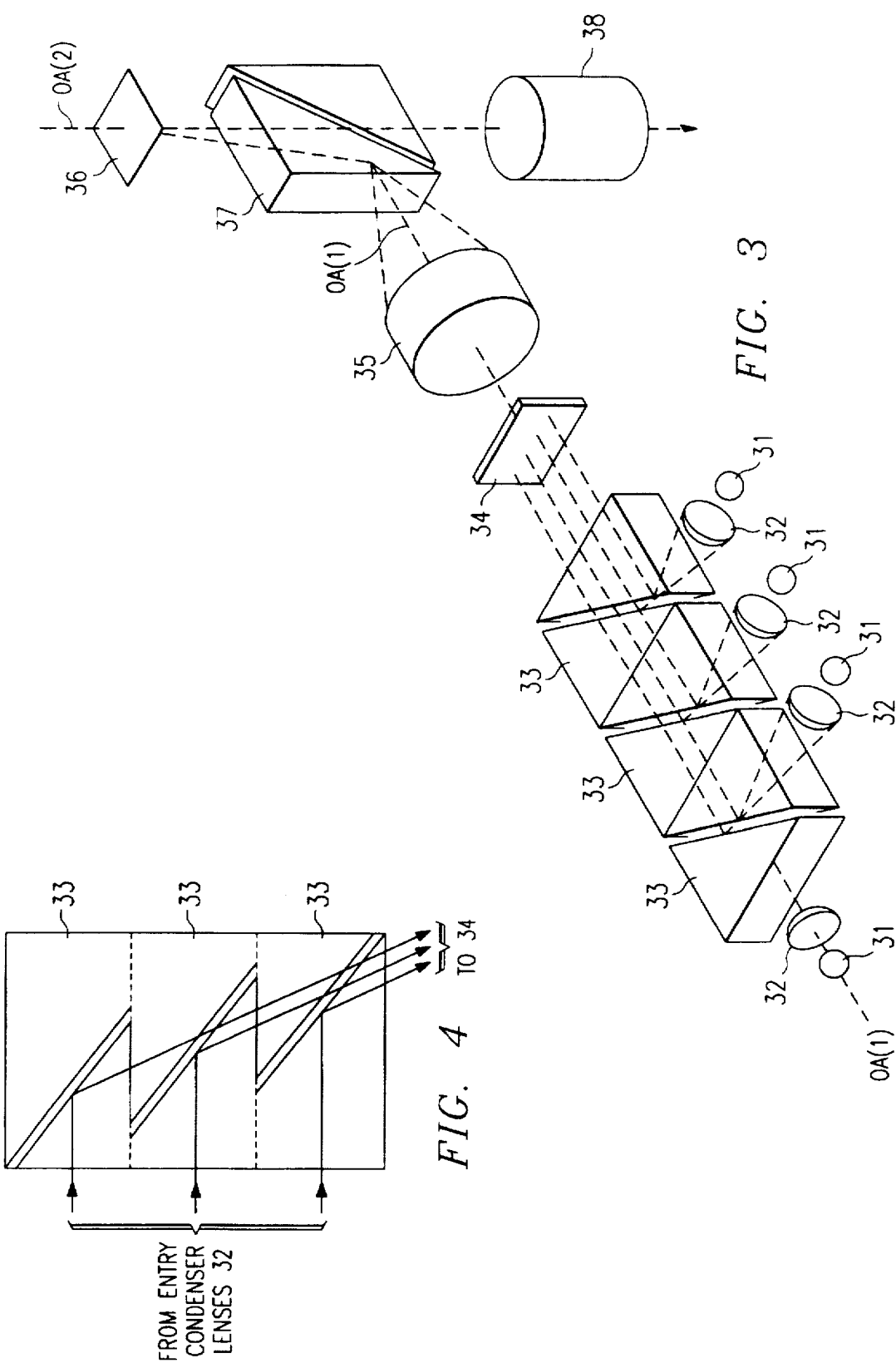

ILLUMINATION OPTICS FOR SPATIAL LIGHT MODULATOR

This application is a Continuation of application Ser. No. 08/429,367 filed on Apr. 26, 1995 now abandoned.

CROSS REFERENCE TO RELATED APPLICATIONS

Cross reference is made to the following commonly assigned patent application 08/371,348 "DMD Modulated Continuous Wave Light Source for Xerographic Printer" filed Jan. 11, 1995.

TECHNICAL FIELD OF THE INVENTION

This invention relates to spatial light modulators, and more particularly to optical components for providing light to the spatial light modulator.

BACKGROUND OF THE INVENTION

Spatial light modulators (SLMs) are increasingly being used for providing images in both display systems and photoelectric printers. In general, SLMs are arrays of pixel-generating elements that emit or reflect light to an image plane, such as a screen of a display system or a drum of a printer. The SLM modulates light by turning the pixel-generating elements on or off.

Digital micro-mirror devices (DMDs) are one type of SLM. A DMD is an electromechanical device having an array of hundreds or thousands of tiny tilting mirrors. To permit the mirrors to tilt, each is attached to one or more hinges mounted on support posts, and spaced by means of an air gap over underlying control circuitry. The control circuitry provides electrostatic forces, which cause each mirror to selectively tilt. Incident light on the mirror array is reflected by the on mirror elements in one direction and by the off mirror elements in the other direction. The pattern of on versus off mirror elements forms an image. In most applications, the light from the DMD is projected by a projection lens to the image plane.

An SLM may be reflective, such as the DMD, or transmissive. In either case, some sort of light source is required. For reflective SLMs, such as a DMD, there are two light paths, that of the incident light and that of the reflected light. For transmissive SLMs, there may be a single light path. In either case, compactness is usually desirable.

For DMDs, many existing illumination systems for DMDs use a "Koehler" design. A light source, such as a light emitting diode, provides light that is collected by a condenser lens. The condenser lens focusses the light to a specially designed total internal reflection (TIR) prism. The prism is oriented with respect to the condenser lens, the DMD, and a projection lens, such that the light from the condenser lens is reflected to the DMD which modulates the light. Modulated light from the DMD passes back through the prism and to the projection lens. This Koehler illumination system provides a substantially lossless illumination. It also permits the light source to be placed in close proximity to the optical axis, thereby enabling the illumination system to be quite compact in size.

SUMMARY OF THE INVENTION

One aspect of the invention is an anamorphic illumination system for generating images with a reflective spatial light modulator (SLM). Two or more light sources provide light toward a first optical axis. An entry condenser lens associated with each said light source collects light from its associated light source and directs the light along the first optical axis. A cylindrical lens oriented on the first optical axis receives light from each said entry condenser lens. The cylindrical lens is convex with respect to the light sources, such that the cylindrical lens compresses the light from the light sources. An exit condenser lens receives the compressed light from the cylindrical lens. A total internal reflection (TIR) prism receives the compressed light from the exit condenser lens and directs it to the SLM. The SLM modulates the light from the exit condenser lens and reflects the light through the TIR prism along a second optical axis. A projection lens on the second optical axis receives the modulated light from the TIR prism and directs it to an image plane.

An advantage of the anamorphic system is that it extends the source illumination in one direction as well as compresses in an orthogonal direction. The aspect ratio of the illumination beam is thereby adjusted in two ways. The compression increases the flux density. The resulting light is homogenous and can be used to lessen intensity variations among the "on" pixels of the SLM. This system is especially useful for DMDs having mirror elements whose surfaces are slightly non-flat or have some other flaw in their ability to reflect light directly to the pupil of the projection lens. The extended light source permits light to neverless enter the projection lens.

Another aspect of the invention is a cascaded illumination system for generating images with a reflective spatial light modulator (SLM). Two or more light sources are located off a first optical axis of light to the SLM. A entry condenser lens associated with each said light source collects light from its associated light source and directs the light to an internal reflecting surface of an associated entry total internal reflection (TIR) prism. The entry TIR prisms direct the light from light source along the first optical axis, thereby providing a number of outgoing light beams. A condenser lens receives the outgoing light beams from the entry TIR prisms. An exit TIR prism receives the outgoing light beams from the exit condenser lens and directs them along the first optical axis to the SLM. The SLM modulates the light and reflects it back through the exit TIR prism. A projection lens on the second optical axis receives the modulated light from the exit TIR prism and directs it to an image plane.

An advantage of the cascaded illumination system is that it can be used to provide either an extended light source or a light source having increased flux density. Thus, it can be used to either adjust the aspect ratio or the intensity of the source. The light is also homogeneous.

BRIEF DESCRIPTION OF THE DRAWINGS

FIG. 3 illustrates a cascaded illumination system in accordance with the invention.

FIG. 4 illustrates an alternative embodiment of the cascaded illumination system.

DETAILED DESCRIPTION OF THE INVENTION

The following description is directed to two types of illumination systems for a reflective spatial light modulator. Both are "projection" systems, in that a spatial light modulator (SLM) generates an image, which is projected by a projection lens to an image plane. For purposes of example, the SLM is a DMD, but other types of SLMs could be used. For a reflective SLM such as a DMD, the illumination system must accommodate two light paths, one for light incident on the DMD and one for light reflected from the DMD. Other types of SLMs, such as an LCD array, could be transmissive, where the light follows one path through the SLM.

The anamorphic illumination system 10 or the cascaded illumination system 30 could be used in either a printing system or an image display system. In an image display system, the DMD is addressed with data representing pixel intensities. The on/off duration of each pixel element is controlled during each image frame in a form of pulse width modulation. Greyscale images are defined by which pixel are on or off and for how long during each frame. In a printing system, modulated light from the DMD is used to determine whether pixels of the page being printed are on or off, with the duration of exposure time being one method of controlling greyscale.

Examples of a DMD-based image display systems are described in U.S. Pat. No. 5,079,544, entitled "Standard Independent Digitized Video System," in U.S. patent Ser. No. 08/147,249, entitled "Digital Television System," and in U.S. patent Ser. No. 08/146,385, entitled "DMD Display System," each assigned to Texas Instruments Incorporated, and each incorporated by referenced herein. An example of a DMD-based printing system is described in U.S. Pat. No. 5,041,851, entitled "Spatial Light Modulator Printer and Method of Operation", assigned to Texas Instruments Incorporated and incorporated by reference herein. In either the display system or the printer, the anamorphic illumination system 10 or the cascaded illumination system 30 could be substituted for the light source, the DMD, the projection lens, and other related optics.

For purposes of this description, the term "illumination system" is used to refer to all components that provide the image, including the DMD. The term "source optics system" refers to the light source and associated optical devices that provide the light incident on the DMD.

Figure 1:
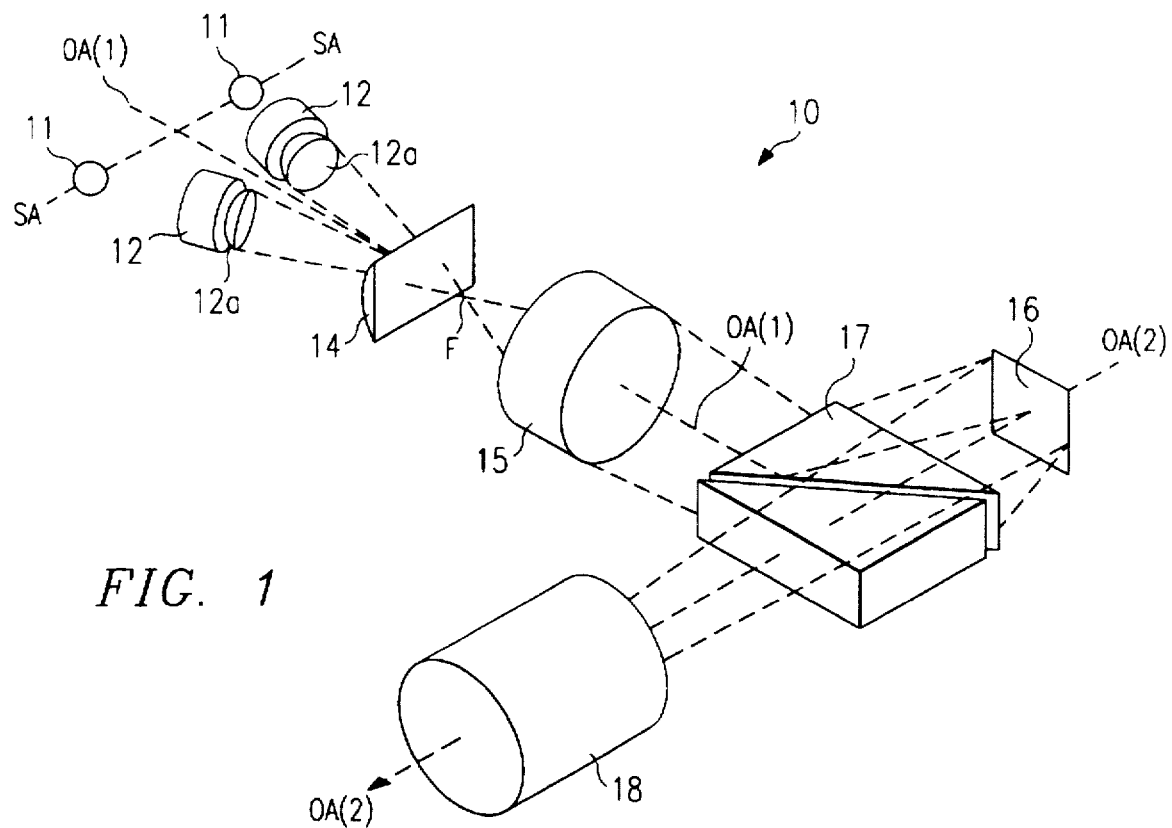
FIGS. 1 and 2 illustrate an anamorphic illumination system in accordance with the invention.
Figure 2:
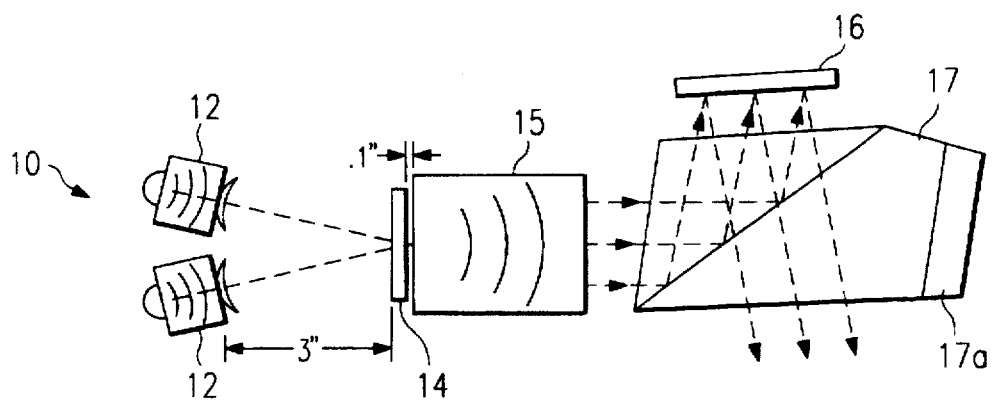

More specifically, FIGS. 1 and 2 illustrate an anamorphic illumination system 10 that provides an elongated and compressed beam of light to the SLM. This type of light is desired for printing systems, which use long narrow arrays to expose strips across the length of a revolving drum. However, for image display systems having non-square aspect ratios, it may be desirable to provide anamorphic illumination, especially as the aspect ratio becomes more exaggerated. FIG. 3 illustrates a cascaded illumination system 30, which may be used to increase the flux or the size of the beam to the SLM, or to provide differently colored beams.

Both the anamorphic system 10 and the cascaded system 30 are modifications of the conventional Koehler illumination system described in the Background. Systems 10 and 30 each use one or more total internal reflection (TIR) prisms, designated as TIR prism 17 in system 10 and as TIR prisms 33 in system 30. Each TIR prism 17, 33 is a beam splitting device comprised of two triangular prisms having their angled surfaces in close proximity to each other. An internal surface of a first prism reflects light out, and an air gap between the two prisms is sufficiently small that light may be transmitted through both prisms. Typically this air gap is in the order of 10 micrometers. The geometry of the TIR prism 17, 33 is optimized for use with the DMD having certain characteristics, such as mirror tilt angle. A black glass diffuser may be placed at the exit surface of the second prism.

Throughout this description, the light source is one or more light emitting diodes (LEDs). Both system 10 and system 30 are especially useful when the light source for one reason or another is desired to be one or more commercial grade LEDs, which tend to have limited intensity. The various embodiments of the invention provide an LED-based source with increased intensity. However, any type of light source, visible or infrared, could be used.

FIG. 1 is a perspective view of an anamorphic illumination system 10. FIG. 2 is a side view of the same system 10 from light sources 11 to the plane of the DMD 16. The components of FIG. 2 are the "source optics system" in the sense that they provide the beam that is incident on DMD 16. FIG. 2 also illustrates typical path lengths from lenses 12 to lens 15, and from lens 15 to DMD 16. The total length of the path from lens 15 to DMD 16 is the same as that of the path from lenses 12 to lens 15, here 3 inches.

In general, system 10 modifies the Koehler system so as to incorporate multiple light sources 11 and a cylindrical lens 14. It provides an elongated and compressed beam of light to the DMD 16.

In the example of this description, there are two light sources 11. However, the same concepts could apply to more than two light sources. The light sources 11 are dome-type LEDs, but could be some other type of source.

As illustrated, light sources 11 are positioned off-axis with respect to the optical axis of an exit condenser lens 15. This optical axis is designated as OA(1). A typical off-axis angle might be 10 degrees off-axis. However, the light sources 11 are aligned along their own light source axis, designated as SA.

Each light source 11 has an associated entry condenser lens 12. Condenser lenses 12 each collect a wide angle of light from their associated light source 11 and focus this light toward a cylindrical lens 14. The focus of entry condenser lenses 12 is at a point, F, between cylindrical lens 14 and an exit condenser lens 15.

In the preferred embodiment, entry condenser lenses 12 are the same as exit condenser lens 15, but have an additional lens 12a, which modifies the second conjugate of each lens 12 to a shorter length. In the example of this description, each lens 12 is an F/0.6 lens with an additional 5 diopter lens. The additional lens shortens the second conjugate of lens 12 from 6 inches to 3 inches.

Light sources 11 and condenser lenses 12 are oriented with respect to each other and to the optical axis so that the beams of light from each source 11 are adjacent at cylindrical lens 14. Thus, cylindrical lens 14 receives an elongated beam comprised of light from both sources 11. If desired, the angle between light sources 11 and condenser lenses 12 can be adjusted so that the beams are overlapping to any desired extent.

The elongated beam from lenses 12 passes through cylindrical lens 14, which compresses the height of the beam. Cylindrical lens 14 is convex with respect to the light sources 11, with the convexity being in a direction orthogonal to the light source axis, SA. Thus, if a wide beam is desired, as shown in FIG. 1, the light source axis would be horizontal and the convexity of cylindrical lens 14 would be vertical. On the other hand, if a tall beam is desired, the light source axis would be vertical and the convexity of the cylindrical lens 14 would be horizontal. In other words, the light sources 11 extend the light, and the cylindrical lens 14 compresses it in the other direction. In other embodiments, the light sources 11 need not be along a straight line axis but in general, are spaced in either a horizontal plane as in FIG. 1 or in a vertical plane.

At point F, the image is of the two light sources, adjacent and slightly overlapping. The result is a beam that is elongated and compressed. This elongated and compressed beam then diverges to the exit condenser lens 15. The extent of elongation of the beam can be varied depending on the orientations of light sources 11. At one extreme, the beam is the width of the two source beams side-by-side with no overlap, whereas at another extreme, the beam is the width of one source beam but twice as intense. In either case, the beam is compressed by cylindrical lens 14. For this reason, the beam from F is referred to as the "compressed" beam.

Exit condenser lens 15 receives the compressed beam and directs it to a TIR prism 17. Optionally, exit condenser lens 15 may have a diffuser.

TIR prism 17 is designed and positioned so that a first internal surface receives the extended source light and reflects it to DMD 16. The angle of incidence of the optical axis on DMD 16 is appropriate for the tilt angle of the "on" mirrors. The light that hits DMD 16 is compressed and elongated, as compared to the light that would be provided by an illumination system such as system 10 but having only a single light source 11. In FIG. 2, TIR prism 17 has a diffuser 17a.

DMD 16 modulates and reflects the incident light from TIR prism 17. The modulated light then passes through TIR prism 17 along a second optical axis, OA(2), to projection lens 18. Projection lens 18 images the modulated light to an image plane, such as the drum of a printer or a display screen.

The anamorphic illumination system 10 of FIGS. 1 and 2 is especially designed to be compact in size and for this reason, uses TIR prism 17 to reflect light to the DMD 16 as well as to transmit light to projection lens 18. TIR prism 17 provides two light paths, one path from exit condenser lens 15 to DMD 16 and the other path reflected from DMD 16 to projection lens 18. Other optical devices, including other beam splitting devices, could be substituted for TIR prism 17 that would provide these two light paths. Many types of optics used after exit condenser lens 15 could be used to further transmit the anamorphic beam of light to DMD 16 in accordance with the invention. In fact, the source optics system along the first optical axis, including sources 11, condenser lenses 12 and 15, and cylindrical lens 14, could be used to provide light to a transmissive type SLM.

FIG. 3 illustrates a cascaded illumination system 30. Illumination system 30 is a modified version of the conventional Koehler system in the sense that it has multiple TIR prisms 33. In FIG. 3, the "source optics system" is the light sources 31, entry condenser lenses 32, TIR prisms 33, diffuser 34, and exit projection lens 35.

Cascaded illumination system 30 is especially useful for providing an increased flux density to the DMD 16 while also increasing the size of the illumination. One application of system 30 might be to have differently colored sources 31. The differently colored source light beams could be directed by TIR prisms 33 on separate but adjacent paths, or they could be merged.

In the example of this description, light sources 31 are LED's, but could be any other type of source. There are four light sources 31 and four light paths through three TIR prisms 33. In general, where there are n TIR prisms 33, there may be n+1 light sources 31. N light sources 31 are placed off the optical axis, OA(1), of the light to DMD 36. An optional light source 31 may be placed on the optical axis.

Each light source 31 has an associated condenser lens 32. Each condenser lens 32 collects a wide angle of light from its source 31 and directs the light to one of the three TIR prisms.

Each TIR prism 33 receives light from an associated light source 31, via the associated condenser lens 32. An internal surface of the TIR prisms 33 reflects the light to the exit condenser lens 35. The TIR prisms 33 are in series, such that light from a source 31 must pass through any TIR prism 33 associated with a source 31 that is closer to DMD 36. The internal reflective surfaces of the TIR prisms 33 are oriented relative to the other surfaces so that the beams of light from the sources 31 follow adjacent parallel paths or the paths may overlap partly or completely.

The TIR prism 33 farthest from the exit condenser lens 35 may also receive light from a second light source 31, which is on the optical axis, OA(1). The light beam from this on-axis source 31 passes through all TIR prisms 33 and is parallel to the light beams from the other sources 31. It may be in a different adjacent path or it may be merged with the other paths.

From TIR prisms 33, the light reaches an optional diffuser 34. An advantage of diffuser 34 is that it provides diffuse illumination to DMD 36, with a resulting image that is sharper than with non diffuse illumination.

From diffuser 34 the light follows the optical axis through an exit condenser lens 35 and to another TIR prism 37 and to DMD 36. TIR prism 37 is similar in function to TIR prism 17 of system 10. A projection lens 38 projects the modulated image from DMD 36 via TIR prism 37, to an image plane.

FIG. 4 illustrates a different version of system 30. TIR prisms 33 have been oriented with respect to each other so that the source beams are merged to follow substantially the same path. FIG. 4 also illustrates that TIR prisms 33 could be made from two pieces of transparent material. The dotted lines illustrate the three TIR prisms 33 but do not represent actual boundaries between separate pieces.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An anamorphic illumination system for generating images, comprising:

two or more light sources providing light toward a first optical axis;

an entry condenser lens associated with each said light source collecting said light from its associated light source and directing said light along said first optical axis;

a cylindrical lens oriented on said first optical axis so as to receive said light from each said entry condenser lens, said cylindrical lens having a convexity with respect to said light sources, such that said cylindrical lens provides a beam of compressed light, said beam comprised of light from said light sources combined into said beam;

an exit condenser lens receiving said compressed light from said cylindrical lens;

an SLM with an array of pixel-generating elements modulating said compressed light from the exit condenser lens, such that said SLM forms an image on said array; and a projection lens on a second optical axis receiving said image from said SLM and directing said image to an image plane.

2. The system of claim 1, further comprising a total internal reflection (TIR) prism receiving said compressed light from said exit condenser lens and directing said compressed light to said SLM, and directing modulated light from said SLM along said second optical axis.

3. The system of claim 2, wherein each of said entry condenser lens and said exit condenser lens have the same structure except for an additional curvature on each said entry condenser lens for shortening the second conjugate.

4. The system of claim 2, wherein said light sources are oriented with respect to said first optical axis so as to provide substantially adjacent beams of said light.

5. The system of claim 2, wherein said light sources are oriented with respect to said first optical axis so as to provide substantially overlapping beams of said light.

6. A cascaded illumination system for generating images generated, comprising:

two or more light sources providing light;

an entry condenser lens associated with each said light source collecting said light from its associated light source;

a separate entry TIR prism associated with each said light source directing said light from its associated entry condenser lens along a first optical axis, thereby providing a number of outgoing light beams, said light sources being located off said first optical axis;

an exit condenser lens receiving said outgoing light beams from said entry TIR prisms, and providing a beam of light comprised of said outgoing light beams combined into said light beam;

an SLM having an array of pixel generating element modulating said light beam from said exit condenser lens, thereby forming an image on said array; and a projection lens receiving said image from said SLM and directing said image to an image plane.

7. The system of claim 6, wherein the internal reflecting surfaces of said entry TIR prisms are oriented with respect to each other so that said outgoing light beams are substantially parallel.

8. The system of claim 6, wherein said internal reflecting surfaces of said entry TIR prisms are oriented with respect to each other so that said outgoing light beams substantially overlap.

9. The system of claim 6, wherein said entry TIR prisms are made from two pieces of material.

10. The system of claim 6, further comprising an additional light source on said first optical axis outside said entry TIR prisms.

11. The system of claim 6, further comprising an exit TIR prism receiving said outgoing light beams from said exit condenser lens, and directing said outgoing light beams along a second optical axis to said SLM.

* * * * *